(12) United States Patent
Lim

(10) Patent No.: US 10,809,963 B2
(45) Date of Patent: Oct. 20, 2020

(54) APPARATUS FOR CONTROLLING DISPLAY OF VEHICLE, SYSTEM HAVING THE SAME, AND METHOD THEREOF

(71) Applicants: Hyundai Motor Company, Seoul (KR); Kia Motors Corporation, Seoul (KR)

(72) Inventor: Jae Wan Lim, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/174,991

(22) Filed: Oct. 30, 2018

(65) Prior Publication Data

US 2020/0065042 A1 Feb. 27, 2020

(30) Foreign Application Priority Data

Aug. 23, 2018 (KR) ........................ 10-2018-0098569

(51) Int. Cl.
*G06F 3/147* (2006.01)
*G06F 3/01* (2006.01)
*B60K 35/00* (2006.01)
*B60W 50/14* (2020.01)

(52) U.S. Cl.
CPC .............. *G06F 3/147* (2013.01); *B60K 35/00* (2013.01); *B60W 50/14* (2013.01); *G06F 3/013* (2013.01); *B60K 2370/152* (2019.05); *B60K 2370/186* (2019.05); *B60W 2050/146* (2013.01)

(58) Field of Classification Search
None
See application file for complete search history.

(56) References Cited

U.S. PATENT DOCUMENTS

2017/0364148 A1* 12/2017 Kim ...................... B60K 37/06

* cited by examiner

*Primary Examiner* — Duane N Taylor, Jr.
(74) *Attorney, Agent, or Firm* — Mintz Levin Cohn Ferris Glovsky and Popeo, P.C.; Peter F. Corless

(57) ABSTRACT

A vehicle display control apparatus for controlling at least one display of a vehicle may include: a processor configured to: calculate a display control resource distribution ratio of the at least one display based on at least one of: an autonomous driving state of the vehicle, a gaze direction of a user, and a characteristic of content displayed by the at least one display, and control operation of the at least one display by allocating a control resource to each of the at least one display based on the calculated display control resource distribution ratio; and a storage configured to store the calculated display control resource distribution ratio.

20 Claims, 7 Drawing Sheets

APPARATUS FOR CONTROLLING DISPLAY OF VEHICLE, SYSTEM HAVING THE SAME, AND METHOD THEREOF

CROSS-REFERENCE TO RELATED APPLICATION

This application claims the benefit of priority to Korean Patent Application No. 10-2018-0098569, filed in the Korean Intellectual Property Office on Aug. 23, 2018, the entire contents of which are incorporated herein by reference.

TECHNICAL FIELD

The present disclosure relates generally to an apparatus for controlling a display of a vehicle, a system having the same, and a method thereof, and more particularly, to a vehicular technology of distributing control resources so as to efficiently control at least one display of the vehicle.

BACKGROUND

Many modern vehicles include a display mounted near the driver seat to provide the driver with various pieces of information. For example, the display may provide information relating to a navigation path from an origin to a destination, an indication of a current location of the vehicle, a current speed of the vehicle, warning signals, and the like. In addition, the vehicle display may display media information, or a terrestrial or satellite broadcast, on a screen. The vehicle display may also provide convenience information associated with a state of the vehicle, weather, news, and so forth.

Generally, a single display may be installed on a center fascia of the vehicle, although more displays are being developed. For example, a cluster display, a head-up display (HUD), and an audio-video-navigation (AVN) display may be implemented in a vehicle at the same time.

As each of these displays uses a micro-computer, areas and costs of the displays have been significantly wasted. Even if a plurality of displays are controlled by one micro-computer, it can be difficult to optimize the micro-computer since the size and the resolution of the displays have been increased. Consequently, the frame of the display may be degraded.

SUMMARY

The present disclosure has been made to solve the above-mentioned problems occurring in the related art while advantages achieved by the related art are maintained intact.

An aspect of the present disclosure provides an apparatus for controlling a display for a vehicle, a system having the same, and a method thereof, capable of calculating a display control resource distribution ratio based on at least one of an autonomous driving state, a gaze direction, and a characteristic of content displayed by a display, and controlling the display based on the calculated display control resource distribution ratio.

Another aspect of the present disclosure provides an apparatus for controlling a display for a vehicle, a system having the same, and a method thereof, capable of saving costs and providing a high-quality image by controlling a plurality of high-performance displays using a low-performance single micro-computer.

The technical problems to be solved by the present disclosure are not limited to the aforementioned problems, and any other technical problems not mentioned herein will be clearly understood from the following description by those skilled in the art to which the present disclosure pertains.

According to embodiments of the present disclosure, a vehicle display control apparatus for controlling at least one display of a vehicle may include: a processor configured to: calculate a display control resource distribution ratio of the at least one display based on at least one of: an autonomous driving state of the vehicle, a gaze direction of a user, and a characteristic of content displayed by the at least one display, and control operation of the at least one display by allocating a control resource to each of the at least one display based on the calculated display control resource distribution ratio; and a storage configured to store the calculated display control resource distribution ratio.

The processor may calculate a display control resource distribution weight of the at least one display based on at least one of: the autonomous driving state of the vehicle, the gaze direction of the user, and the characteristic of the content displayed by the at least one display.

The processor may calculate the display control resource distribution ratio of the at least one display based further on the calculated display control resource distribution weight of the at least one display.

The at least one display may be at least one display among a plurality of displays. The processor may divide a sum of each display control resource distribution weight of a first display among the plurality of displays by a sum of all display control resource distribution weights of the plurality of displays, wherein each display control resource distribution weight is calculated based on the autonomous driving state of the vehicle, the gaze direction of the user, and the characteristic of the content displayed by the at least one display; convert a result of the division to a percentage value; subtract a display control resource distribution ratio for a minimum screen display from the percentage value; and set a result of the subtraction as a display control resource distribution ratio of the first display.

The processor may when the vehicle is in a semi-autonomous driving state, increase the display control resource distribution weight of the first display, which displays a driving state of the vehicle, or a display control resource distribution weight of a second display, which displays an alarm, among the plurality of displays; when the vehicle is in the autonomous driving state, increase a display control resource distribution weight of a third display, which displays multimedia content, among the plurality of displays; and when the vehicle is in a normal driving state, increase the display control resource distribution weight of the first display.

The processor may increase a display control resource distribution weight of a display, which is positioned in the gaze direction of the user, among the plurality of displays based on the gaze direction of the user.

The processor may: when the gaze direction of the user is a forward direction, increase a display control resource distribution weight of a head-up display among the plurality of displays; when the gaze direction of the user is a downward direction, increase a display control resource distribution weight of a cluster display among the plurality of displays; and when the gaze direction of the user is a right direction, increase a display control resource distribution weight of an audio-video-navigation (AVN) display among the plurality of displays.

The processor may: when an alarm is displayed by the first display in an emergency situation, increase the display control resource distribution weight of the first display or a display control resource distribution weight of a second display, which displays an alarm, among the plurality of displays; and when a guide to an intersection is displayed, increase a display control resource distribution weight of a third display, which displays multimedia content, among the plurality of displays until the vehicle passes the intersection.

The processor may: when an urgent alarm is displayed due to failure of the vehicle while the third display is operating, control operation of the plurality of displays so as to use all resources for the first display or the second display after temporarily stopping operation of the third display.

Furthermore, according to embodiments of the present disclosure, a vehicle system may include: at least one display, each display provided at different positions inside a vehicle, and a vehicle display control apparatus configured to calculate a display control resource distribution ratio of the at least one display based on at least one of: an autonomous driving state of the vehicle, a gaze direction of a user, and a characteristic of content displayed by the at least one display; and control operation of the at least one display by allocating a control resource to each of the at least one display based on the calculated display control resource distribution ratio.

The vehicle display control apparatus may calculate a display control resource distribution weight of the at least one display based on at least one of: the autonomous driving state of the vehicle, the gaze direction of the user, and the characteristic of the content displayed by the at least one display.

The vehicle display control apparatus may calculate a display control resource distribution ratio of the at least one display based further on the calculated display control resource distribution weight of the at least one display.

According to another aspect of the present disclosure, a method of controlling at least one display of a vehicle may include calculating, by a processor, a display control resource distribution ratio of the at least one display based on at least one of: an autonomous driving state of the vehicle, a gaze direction of a user, and a characteristic of content displayed by the at least one display; and controlling, by the processor, operation of the at least one display by allocating a control resource to each of the at least one display based on the calculated display control resource distribution ratio.

The calculating of the display control resource distribution ratio may include calculating, by the processor, a display control resource distribution weight of the at least one display based on at least one of: the autonomous driving state of the vehicle, the gaze direction of the user, and the characteristic of the content displayed by the at least one display.

The calculating of the display control resource distribution ratio may further include calculating, by the processor, the display control resource distribution ratio of the at least one display based further on the calculated display control resource distribution weight of the at least one display.

The at least one display may be at least one display among a plurality of displays. The calculating of the display control resource distribution ratio may further include dividing, by the processor, a sum of each display control resource distribution weight of a first display among the plurality of displays by a sum of all display control resource distribution weights of the plurality of displays, wherein each display control resource distribution weight is calculated based on the autonomous driving state of the vehicle, the gaze direction of the user, and the characteristic of the content displayed by the at least one display; converting, by the processor, a result of the division to a percentage value; subtracting, by the processor, a resource distribution ratio for a minimum screen display from the percentage value; and setting, by the processor, a result of the subtraction as a display control resource distribution ratio of the first display.

The calculating of the display control resource distribution weight may include: when the vehicle is in a semi-autonomous driving state, increasing, by the processor, a display control resource distribution weight of the first display, which displays a driving state of the vehicle, or a display control resource distribution weight of a second display, which displays an alarm, among the plurality of displays; when the vehicle is in the autonomous driving state, increasing, by the processor, a display control resource distribution weight of a third display, which displays multimedia content, among the plurality of displays; and when the vehicle is in a normal driving state, increasing, by the processor, a display control resource distribution weight of the first display.

The calculating of the display control resource distribution weight may include increasing, by the processor, a display control resource distribution weight of a display, which is positioned in the gaze direction of the user, among the plurality of displays based on the gaze direction of the user.

The calculating of the display control resource distribution weight may include: when the gaze direction of the user is a forward direction, increasing, by the processor, a display control resource distribution weight of a head-up display among the plurality of displays; when the gaze direction of the user is a downward direction, increasing, by the processor, a display control resource distribution weight of a cluster display among the plurality of displays; and when the gaze direction of the user is a right direction, increasing, by the processor, a display control resource distribution weight of an audio-video-navigation (AVN) display among the plurality of displays.

The calculating of the display control resource distribution weight may include: when an alarm is displayed by the first display in an emergency situation, increasing, by the processor, the display control resource distribution weight of the first display or a display control resource distribution weight of a second display, which displays an alarm, among the plurality of displays; and when a guide to an intersection is displayed, increasing, by the processor, a display control resource distribution weight of a third display, which displays multimedia content, among the plurality of displays until the vehicle passes the intersection.

BRIEF DESCRIPTION OF THE DRAWINGS

The above and other objects, features and advantages of the present disclosure will be more apparent from the following detailed description taken in conjunction with the accompanying drawings.

Figure 1:
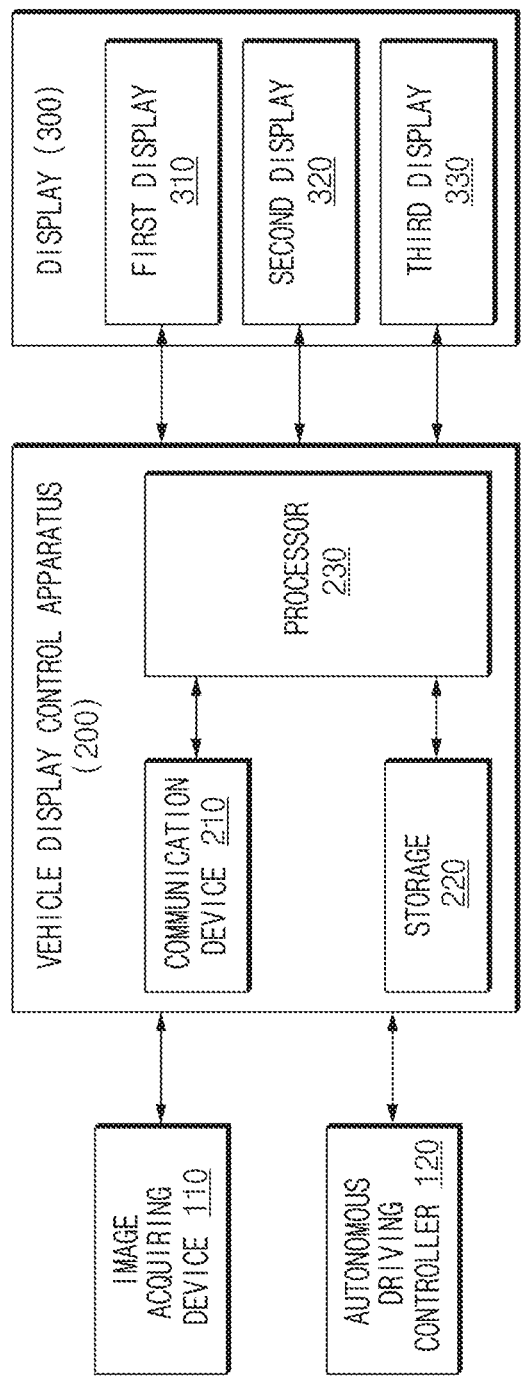
FIG. 1 is a block diagram illustrating elements of a system for controlling a display for a vehicle, according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. In adding reference denotations to elements of each drawing, although the same elements are displayed on a different drawing, it should be noted that the same elements have the same denotations. In addition, in describing an embodiment of the present disclosure, if it is determined that a detailed description of related well-known configurations or functions blurs the gist of an embodiment of the present disclosure, it will be omitted.

In describing elements of embodiments of the present disclosure, the terms 1st, 2nd, first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, devices, or the like, as described herein. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinafter, embodiments of the present disclosure will be described in detail with reference to FIGS. 1 to 7.

FIG. 1 is a block diagram illustrating elements of a system for controlling a display for a vehicle (hereinafter, referred to as a "vehicle display control system"), according to embodiments of the present disclosure.

As shown in FIG. 1, according to embodiments of the present disclosure, the vehicle display control system includes an image acquiring device 110, an autonomous driving controller 120, an apparatus for controlling a display for a vehicle (hereinafter, referred to as a "vehicle display control apparatus") 200, and a display 300.

The image acquiring device 110 may include a camera mounted inside the vehicle to photograph the face of a user, and to trace the movement of an eyeball of the user. The processor 230 may determine a gaze direction of the user by using information on the movement of the eyeball, which is acquired by the image acquiring device 110.

The autonomous driving controller 120 is a device to control the driving of the vehicle in one of a full autonomous driving mode, a semi-autonomous driving mode, and a normal driving mode, and provides information on a present autonomous driving state of the vehicle to the vehicle display control apparatus 200. The full autonomous driving mode is a mode that the vehicle autonomously controls the driving thereof, and the semi-autonomous driving mode is a mode that the vehicle autonomously controls the driving thereof, but, as soon as a user is involved, the user may personally drive the vehicle. The normal driving mode is a mode that the user personally controls the driving of the vehicle without the assist of a system.

The vehicle display control apparatus 200 calculates a weight (hereinafter, referred to as "display control resource distribution weight") for distributing control resources of a display based on at least one of an autonomous driving state of the vehicle, a gaze direction of a user, and a content characteristic displayed on the display, and controls at least one display based on the display control resource distribution weight.

In this case, the display control resource distribution weight refers to a weight allowing the vehicle display control apparatus 200 to distribute resources (i.e., control display performance) to control a first display 310, a second display 320, and a third display 330. For example, when the vehicle is in the autonomous driving state, since a user focuses on multimedia content rather than the driving of the vehicle, a display control resource distribution weight of the third display 330, which displays multimedia content, is increased in the direction of increasing the display performance of the multimedia content.

To this end, the vehicle display control apparatus 200 may include a communication device 210, a storage 220, and a processor 230.

The communication device 210 is a hardware device implemented with various electronic circuits to transmit and receive a signal through wireless connection or wired connection. In the present disclosure, the communication device 210 performs in-vehicle communication through controller area network (CAN) communication and makes communication with the image acquiring device 110, the autonomous driving controller 120, and the display 300.

The storage 220 may store image data acquired from the image acquiring device 110 and data computed by the processor 230. The storage 220 may include a storage medium including at least one of a flash memory type of memory, a hard disk type of memory, a micro-type of memory, a card type of memory (e.g., a secure digital card (SD) or an eXtream digital card (XD)), a random access memory (RAM), a static RAM (SRAM), a read-on memory (ROM), a programmable memory (PROM), an electrically erasable PROM (EEPROM), a magnetic RAM (MRAM), a magnetic disk type of memory, an optical disk type of memory, or any combination thereof.

The processor 230 may be electrically connected with the image acquiring device 110, the autonomous driving controller 120, and the display 300, in addition to the communication device 210 and the storage 220, may electrically control elements, and may be an electrical circuit to execute instruction of software. Accordingly, the processor 230 may perform various data processing and computation to be described later.

The processor 230 may determine content displayed on the first display (e.g., HUD) 310, the second display (e.g., cluster) 320, and the third display (e.g., AVN display) 330 based on at least one of the information on the autonomous driving state, the information of the gaze of the user, and the content characteristic displayed on the display 300, and may set display control resource distribution weights of the first display 310, the second display 320, and the third display 330 to different values.

The processor 230 may determine the gaze direction of the user based on information received from the image acquiring device 110, may determine a driving mode among the full autonomous driving mode, the semi-autonomous driving mode, and the normal driving mode, based on the information on the autonomous driving state received from the autonomous driving controller 120, and may determine whether a present driving state is a dangerous state. In addition, the processor 230 may determine whether a present driving position of the vehicle approaches an intersection or whether a warning is required, by using map information previously stored in the storage 220 or received from the navigation device. The processor 230 may determine the failure of the vehicle through the communication with devices in the vehicle to output an urgent warning through the display 300.

The processor 230 may calculate display control resource distribution weights based on at least one of the autonomous driving state of the vehicle, the gaze direction of the user, and characteristics of content displayed by the first, second, and/or third displays 310, 320, and 330, and may calculate a display control resource distribution ratio of each of at least one display, for example, the displays 310, 320, and 330, based on display control resource distribution weights of each of display, for example, the displays 310, 320, and 330.

In addition, the processor 230 may calculate display control resource distribution weights based on the autonomous driving state of the vehicle, the gaze direction of the user, and each content characteristic displayed on the displays. And may calculate a display control resource distribution ratio of each of at least one display by using each display control resource distribution weight.

In this case, the processor 230 may calculate display control resource distribution ratios through following Equation 1 to Equation 3.

$$F\_HUD(\%) = \frac{(F2\_HUD + F3\_HUD + F4\_HUD)}{(F2\_HUD + F3\_HUD + F4\_HUD) + (F2\_HUD + F3\_HUD + F4\_HUD) + (F2\_AVN + F3\_AVN + F4\_AVN)} \times (100 - F\_Min)$$

Equation 1

$$F\_CLU(\%) = \frac{(F2\_CLU + F3\_CLU + F4\_CLU)}{(F2\_CLU + F3\_CLU + F4\_CLU) + (F2\_HUD + F3\_HUD + F4\_HUD) + (F2\_AVN + F3\_AVN + F4\_AVN)} \times (100 - F\_Min)$$

Equation 2

$$F\_AVN(\%) = \frac{(F2\_AVN + F3\_AVN + F4\_AVN)}{(F2\_AVN + F3\_AVN + F4\_AVN) + (F2\_AVN + F3\_AVN + F4\_AVN) + (F2\_AVN + F3\_AVN + F4\_AVN)} \times (100 - F\_Min)$$

Equation 3

Equation 1 is used to calculate a display control resource distribution ratio (F_HUD %) of the first display 310, Equation 2 is used to calculate a display control resource distribution ratio (F_CLU %) of the second display 320, and Equation 3 is used to calculate a display control resource distribution ratio (F_AVN %) of the third display 330.

In this case, "F2_HUD" is the display control resource distribution weight of the first display 310 based on the autonomous driving state, "F2_CLU" is the display control resource distribution weight of the second display 320 based on the autonomous driving state, and "F2_AVN" is the display control resource distribution weight of the third display 330 based on the autonomous driving state.

In addition, "F3_HUD" is the display control resource distribution weight of the first display 310 based on the gaze direction of the user, "F3_CLU" is the display control resource distribution weight of the second display 320 based on the gaze direction of the user, and "F3_AVN" is the display control resource distribution weight of the third display 330 based on the gaze direction of the user.

In addition, "F4_HUD" is the display control resource distribution weight of the first display 310 based on the content characteristic displayed on the display, "F4_CLU" is the display control resource distribution weight of the second display 320 based on the content characteristic displayed on the display, and "F4_AVN" is the display control resource distribution weight of the third display 330 based on the content characteristic displayed on the display. In this case, "F min" is a resource ratio for the display of the minimum screen.

The processor 230 allocates control resources to the displays 310, 320, and 330 based on the display control resource distribution ratios of the displays 310, 320, and 330 calculated through Equation 1 to Equation 3.

The processor 230 may increase the display control resource distribution weight of the first display 310 to display the driving state or the display control resource distribution weight of the second display 320 to display a warning, when the vehicle is in the semi-autonomous driving state. The processor 230 may increase the display control resource distribution weight of the third display to display multimedia content when the vehicle is in the autonomous driving state. The processor 230 may increase the display control resource distribution weight of the first display when the vehicle is in the normal driving state.

The processor 230 may increase the display control resource distribution weight of the display positioned in the gaze direction of a user, based on the gaze direction of the user.

The processor 230 may increase the display control resource distribution weight of the head-up display when the gaze direction of the user is a forward direction, may increase the display control resource distribution weight of the cluster display when the gaze direction of the user is a downward direction, and may increase the display control resource distribution weight of the AVN display when the gaze direction of the user is a right direction.

The processor 230 may increase the display control resource distribution weight of the first display to display the driving state or the display control resource distribution weight of the second display to display a warning, when the warning is displayed in an emergency situation. When the guide to the interconnection is displayed, the processor 230 may increase the display control resource distribution weight of the third display to display the multimedia content until the vehicle passes the intersection.

When an urgent warning is displayed due to the failure of the vehicle during the operation of the third display, the processor 230 may temporarily stop the operation of the third display and may control all resources to be used for the first display or the second display.

The display 300 may display, with higher resolution, information, such as vehicle driving information, warning information, or multimedia content, which is required during the driving of the vehicle. To this end, the display 300 may include a plurality of displays, in detail, may include the first display 310, the second display 320, and the third display 330. Although the present disclosure discloses three displays as illustrated in FIG. 1, the present disclosure is not limited thereto. For example, at least or at most three displays may be provided.

The first display 310 may display the vehicle driving information and may include a HUD provided at an upper-front portion of the vehicle.

The second display 320 may display the state information of the vehicle or the warning information of the vehicle and may include a cluster provided at a lower-front portion of the vehicle.

The third display 330 may include map information, multimedia content, or the like, and may include an AVN display provided the central-front portion of the vehicle.

The display 300 may include at least one of a liquid crystal display (LCD), a thin film transistor-LCD, a light emitting diode (LED), an organic LED (OLED), an active matrix OLED, a flexible display, a bended display, and a 3D display. Some of the above displays may be realized with a transparent display including a transmissive-type display or a light-transmissive-type display such that an outside is viewed. In addition, the display 300 may be provided in the form of a touchscreen including a touch panel to be used as an input device in addition to an output device.

As described, according to embodiments of the present disclosure, different display control resource distribution ratios are applied for controlling operation of the displays, based on at least one of the autonomous driving state, the gaze direction of the user, characteristics of the displayed content. Accordingly, a plurality of displays 310, 320, and 330 having higher performance may be controlled only through a single MICOM (i.e., the vehicle display control apparatus 200) having lower performance.

Therefore, according to the present disclosure, a plurality of displays having higher performance are controlled only through the single MICOM having the lower performance, so high-quality image is provided for a user without a plurality of MICOMs or a single MICOM having higher performance. Accordingly, costs may be saved and productivity may be improved.

Hereinafter, a method of distributing control resources (hereinafter, referred to as a "control resource distribution method") by the vehicle display control apparatus 200 will be described in detail with reference to FIGS. 2 to 6. Hereinafter, it is assumed that the vehicle display control apparatus 200 performs processes in FIGS. 2 to 6. In addition, in the following description made with reference to FIGS. 2 to 6, it is understood that the operations described as being performed by the vehicle display control apparatus 200 are controlled by the processor 230 of the vehicle display control apparatus 200.

Figure 2:
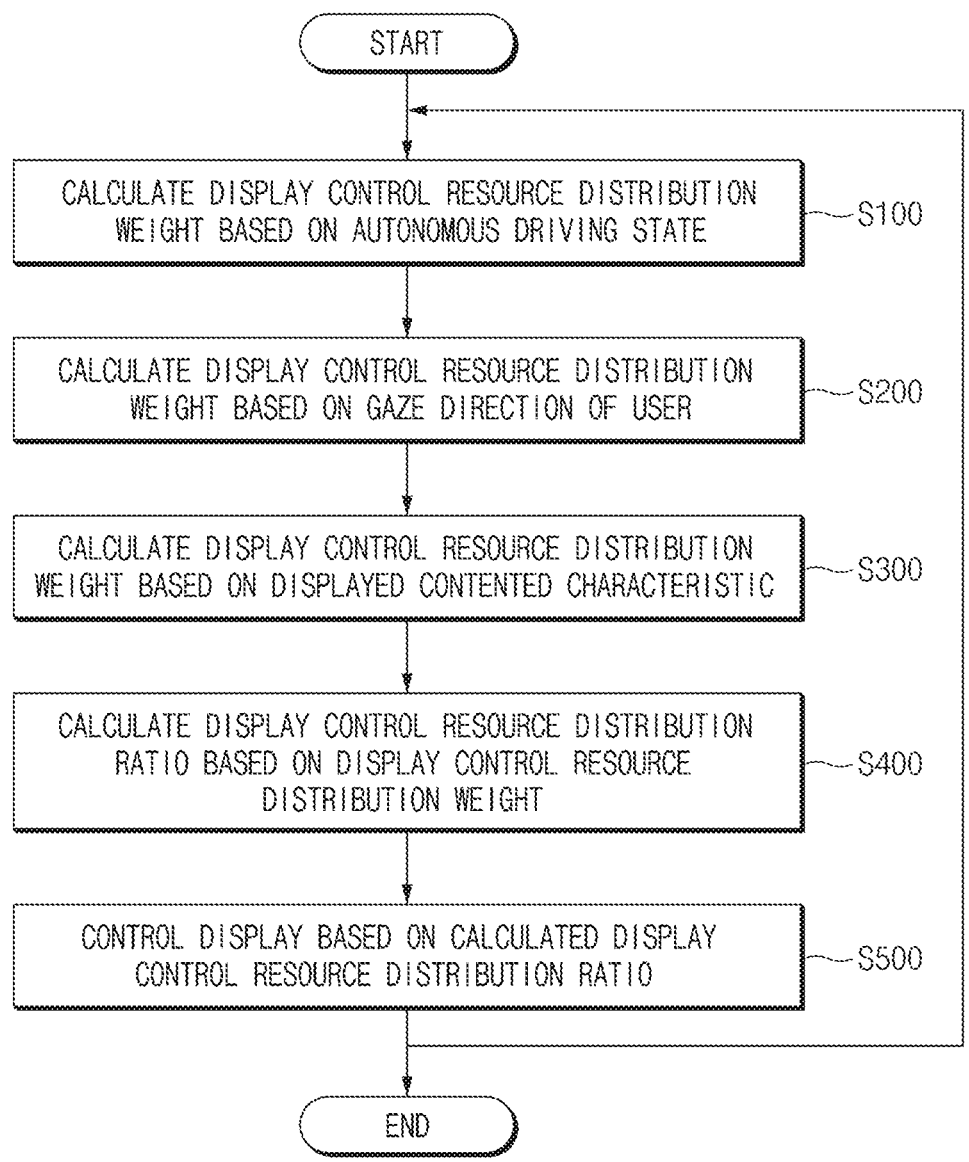
FIG. 2 is a flowchart illustrating a method of distributing control resources by the apparatus for controlling the display for the vehicle, according to embodiments of the present disclosure.

Hereinafter, the control resource distribution method of the vehicle display control apparatus 200 will be described in detail with reference to FIG. 2. FIG. 2 is a flowchart illustrating the control resource distribution method of the vehicle display control apparatus, according to embodiments of the present disclosure.

As shown in FIG. 2, the vehicle display control apparatus 200 calculates a display control resource distribution weight based on an autonomous driving state (S100). The display control resource distribution weight may refer to a weight for distributing resources (i.e., controlling display performance) used to control the first display 310, the second display 320, and the third display 330. For example, when the vehicle is in the autonomous driving state, since a user focuses on multimedia content rather than the driving of the vehicle, a display control resource distribution weight of the third display 330, which displays multimedia content, is increased in the direction of increasing the display performance of the multimedia content.

The vehicle display control apparatus 200 calculates a display control resource distribution weight based on a gaze direction of the user (S200). For example, when the gaze direction of the user is a forward direction, the vehicle display control apparatus 200 determines that the user views the HUD positioned at the upper front portion of the vehicle and increases the display control resource distribution weight of the HUD.

The vehicle display control apparatus 200 calculates a display control resource distribution weight based on a content characteristic displayed on the display 300 (S300). For example, when the guide to the interconnection is displayed on the third display 330, the vehicle display control apparatus 200 may increase the display control resource distribution weight of the third display 330 until the vehicle passes the intersection.

Then, the vehicle display control apparatus 200 calculates display control resource distribution ratios by using the display control resource distribution weights of the displays 310, 320, and 330 calculated based on the autonomous driving state, the gaze direction of the user, and the content characteristic (S400). In this case, based on 100%, the display control resource distribution ratios of the first display 310, the second display 320, and the third display 330 are calculated.

For example, the vehicle display control apparatus 200 divides the sum of the display control resource distribution weights of the first display 310, which are calculated based on the autonomous driving state, the gaze direction of the user, and the content characteristic, by the sum of the display control resource distribution weights of the first display 310, the second display 320, and the third display 330 calculated based on the autonomous driving state, the gaze direction of the user, and the content characteristic. Then, the vehicle display control apparatus 200 multiples the dividing result by 100, subtracts a display control resource distribution ratio for the minimum screen display (or for still image display) from the multiplying result, and then calculates the remaining value as the display control resource distribution ratio of the first display 310.

The vehicle display control apparatus 200 controls the display based on the calculated display control resource distribution ratio (S500). For example, when the display control resource distribution ratio of the first display 310 is calculated to 20%, the display control resource distribution ratio of the second display 320 is calculated to 10%, and the display control resource distribution ratio of the third display 330 is calculated to 70%, the vehicle display control apparatus 200 may perform control operations such that the performances of the first display 310, the second display 320, and the third display 330 are implemented to 20%, 10%, and 70%.

Figure 3:
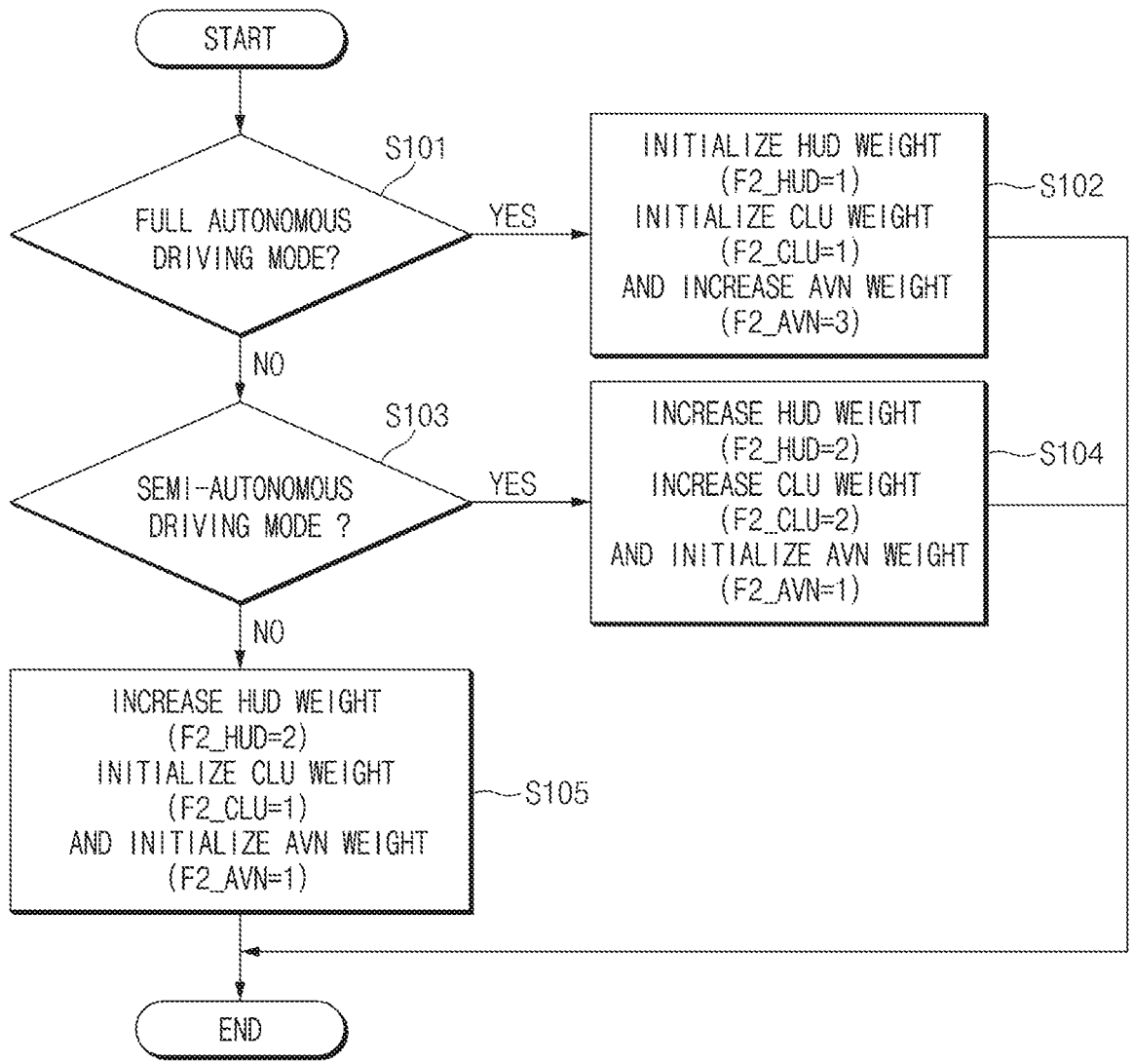
FIG. 3 is a flowchart illustrating a method of calculating a weight for distributing control resources based on an autonomous driving state by the apparatus for controlling the display for the vehicle, according to embodiments of the present disclosure.

Hereinafter, a method of calculating the display control resource distribution weight based on the autonomous driving state by the vehicle display control apparatus according to an embodiment of the present disclosure will be described in detail with reference to FIG. 3. FIG. 3 is a flowchart illustrating a method of calculating the display control resource distribution weight based on the autonomous driving state by the vehicle display control apparatus, according to embodiments of the present disclosure.

The vehicle display control apparatus 200 determines whether the vehicle is currently in the full autonomous driving mode (S101). In this case, the full autonomous driving mode refers to a mode that the vehicle is driven by the autonomous driving controller 120 without the intervention of the user.

It is determined that the vehicle is currently in the full autonomous driving mode in operation S101, the vehicle display control apparatus 200 increases the display control resource distribution weight of the third display (AVN) 330 to display multimedia content (F2_AVN=3) (S102) since the user is less involved in driving the vehicle and is more interested in viewing multimedia content. In this case, the vehicle display control apparatus 200 increases the display control resource distribution weight of the first display (HUD) 310 by 1 (F2_HUD=1) and increases the display control resource distribution weight of the second display (CLU) 320 by 1 (F2_CLU=1). In other words, in the full autonomous driving mode, the vehicle display control apparatus 200 may more greatly increase the weight of the third display 330 even though increasing the display control resource distribution weights of the first display 310 and the second display 320.

If the vehicle is not in the full autonomous driving mode currently in operation S101, the vehicle display control apparatus 200 determines whether the vehicle is in a semi-autonomous driving mode (S103). In this case, the semi-autonomous driving mode refers to a driving mode that the vehicle display control apparatus 200 controls the autonomous driving, but the user is involved in driving the vehicle in some degree. Since various unexpected situations may occur in the semi-autonomous driving mode, it is important to make a user rapidly or exactly recognize the driving state or the warning state.

If the vehicle is in the semi-autonomous driving mode in operation S103, the vehicle display control apparatus 200 may increase the display control resource distribution weight of the first display 310 or the second display 320 to increase the display performance of the first display 310 or the second display 320, which displays the driving state or the warning state, such that the user rapidly or exactly recognizes the driving state or the warning state (F2_HUD=2 and F2_CLU=2) (S104). In this case, the vehicle display control apparatus 200 may increase the display control resource distribution weight of the first display 310 or the second display 320 to "2" and may initialize the display control resource distribution weight of the third display 330 to "1" (F2_AVN=1).

If it is determined that the vehicle is in the normal driving mode instead of the semi-autonomous driving mode in operation S103, since the user mainly gazes forward to exactly recognize the driving information in the normal driving mode, the vehicle display control apparatus 200 increases the display control resource distribution weight of the first display 310 (F2_HUD=2) (S105). In this case, the display control resource distribution weights of the second display 320 and the third display 330 are initialized (F2_CLU=1 and F2_AVN=1).

As described above, according to the present disclosure, the display control resource distribution weight of at least one of a plurality of displays may be increased depending on autonomous driving states (i.e., full autonomous driving mode, semi-autonomous driving mode, or normal driving mode).

Figure 4:
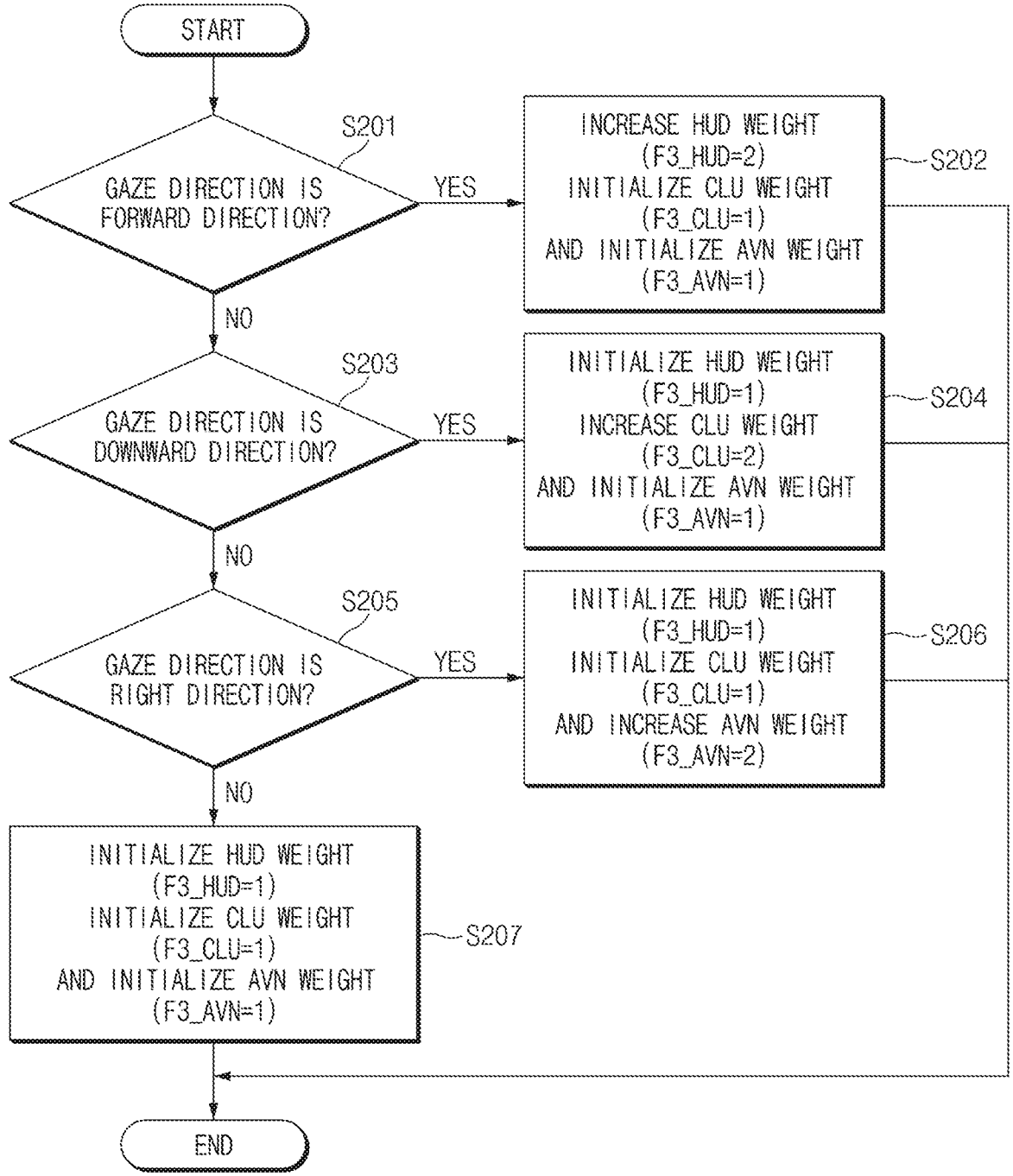
FIG. 4 is a flowchart illustrating a method of calculating a weight for distributing control resources based on a gaze direction by the apparatus for controlling the display for the vehicle, according to embodiments of the present disclosure.

Hereinafter, the method for calculating the display control resource distribution weight according to an embodiment of the present disclosure will be described in detail with reference to FIG. 4. FIG. 4 is a flowchart illustrating a method of calculating the display control resource distribution weight based on a gaze direction by the vehicle display control apparatus, according to embodiments of the present disclosure.

First, the vehicle display control apparatus 200 may determine the gaze direction of the user by acquiring the information on the gaze direction of the user from the image acquiring device 110 (S201).

When the gaze direction of the user is the forward direction, the vehicle display control apparatus 200 increases the display control resource distribution weight of the first display (HUD) 310 positioned in the front of the vehicle (F3_HUD=2) (S202). In this case, the display control resource distribution weights of the second display (CLU) 320 and the third display (AVN) 330 may be initialized to "1" (F3_CLU=1 and F3_AVN=1).

Meanwhile, the vehicle display control apparatus 200 determines whether the gaze direction of the user is the downward direction if the gaze direction of the user is not the forward direction (S203). If the gaze direction of the user is the downward direction, the vehicle display control apparatus 200 increases the display control resource distribution weight of the second display 320 positioned at a lower-front portion of the vehicle (F3_CLU=2) (S204). In this case, the display control resource distribution weights of the first display 310 and the third display (AVN) 330 may be initialized to "1" (F3_HUD=1 and F3_AVN=1).

Meanwhile, when the gaze direction of the user is not the downward direction, the vehicle display control apparatus 200 determines whether the gaze direction of the user is the right direction (S205).

If the gaze direction of the user is the right direction, the vehicle display control apparatus 200 determines that the user gazes at the third display 330 positioned at the central-front portion of the vehicle to increase the display control resource distribution weight of the third display 330 (F3_AVN=2) (S206). In this case, the display control resource distribution weights of the first display 310 and the second display 320 may be initialized to "1" (F3_HUD=1 and F3_CLU=1).

Meanwhile, if the gaze direction of the user are not all the forward direction, the downward direction, and the right direction, the display control resource distribution weights of the first display 310, the second display 320, and the third display (AVN) 330 may be initialized to "1" (F3_HUD=1, F3_CLU=1, AND F3_AVN=1) (S207).

Figure 5:
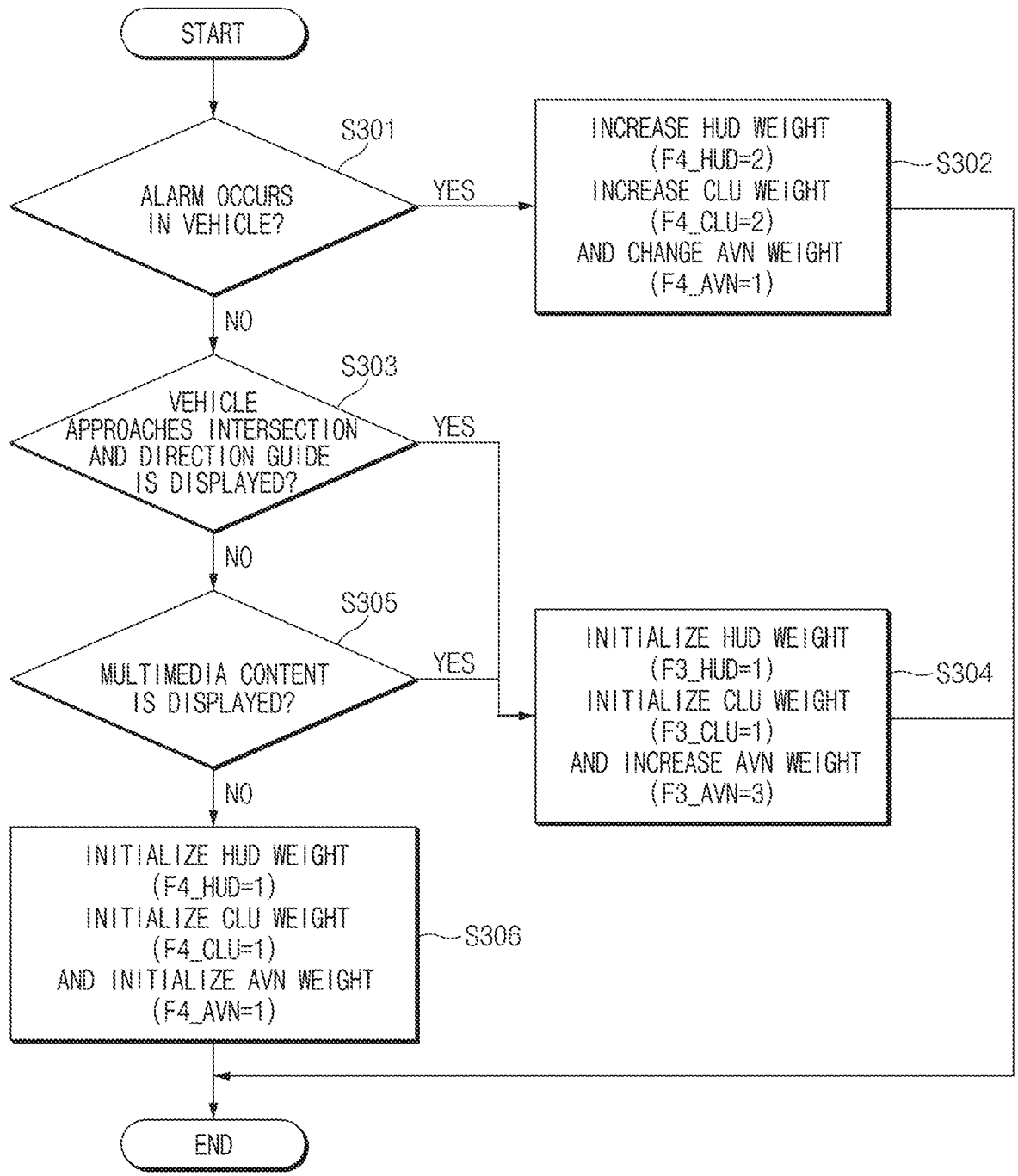
FIG. 5 is a flowchart illustrating a method of calculating a weight for distributing control resources based on a content characteristic, which is displayed, by the apparatus for controlling the display for the vehicle, according to embodiments of the present disclosure.

Hereinafter, a method of calculating the display control resource distribution weight based on the display content characteristic of the vehicle display control apparatus according to an embodiment of the present disclosure will be described with reference to FIG. 5. FIG. 5 is a flowchart illustrating the method of calculating the display control resource distribution weight based on a content characteristic, which is displayed, by the vehicle display control apparatus, according to embodiments of the present disclosure.

The vehicle display control apparatus 200 determines whether there occurs a warning from a driving situation or a dangerous situation (S301). In this case, the vehicle display control apparatus 200 may determine whether there occur the warning, based on driving situation information received from various sensor devices associated with the vehicle or dangerous situation information received from the vehicle display control apparatus 200.

When it is determined that a current situation is a situation that the warning occurs in the vehicle in operation S301, the vehicle display control apparatus 200 increases the display control resource distribution weights of the first display 310 and/or the second display 320 to display the warning (F4_HUD=2 and F4_CLU=2) (S302). In this case, the display control resource distribution weight of the third display 330 is initialized to "1" (F4_AVN=1)

Meanwhile, if the current situation is not the situation that the warning occurs in the vehicle in operation S301, the vehicle display control apparatus 200 determines whether the vehicle approaches the intersection or a screen for the guide to the driving direction is displayed (S303).

If it is determined that the vehicle approaches the intersection or a screen for the guide to the driving direction is displayed, the vehicle display control apparatus 200 increases the display control resource distribution weight of the third display 330 (F4_AVN=3) (S304). In this case, the display control resource distribution weights of the first display 310 and the second display 320 may be initialized to "1" (F3_HUD=1 and F3_CLU=1).

Meanwhile, if it is not determined that the vehicle approaches the intersection or the screen for the guide to the driving direction is displayed, the vehicle display control apparatus 200 determines whether a multimedia information screen (i.e., content) is being displayed (S305). If the multimedia information screen is being displayed, the vehicle display control apparatus 200 increases the display control resource distribution weight of the third display 330 (F4_AVN=3) (S304). In this case, both the display control resource distribution weights of the first display 310 and the second display 320 may be initialized to "1" (F3_HUD=1 and F3_CLU=1).

If the current situation is not the situation that the warning occurs in the vehicle, the vehicle does not approach the intersection, and the screen for the guide to the driving direction is not displayed, the display control resource distribution weights of the first display 310, the second display 320, and the third display (AVN) 330 may be initialized to "1" (F3_HUD=1 and F3_AVN=1) (S306).

Figure 6:
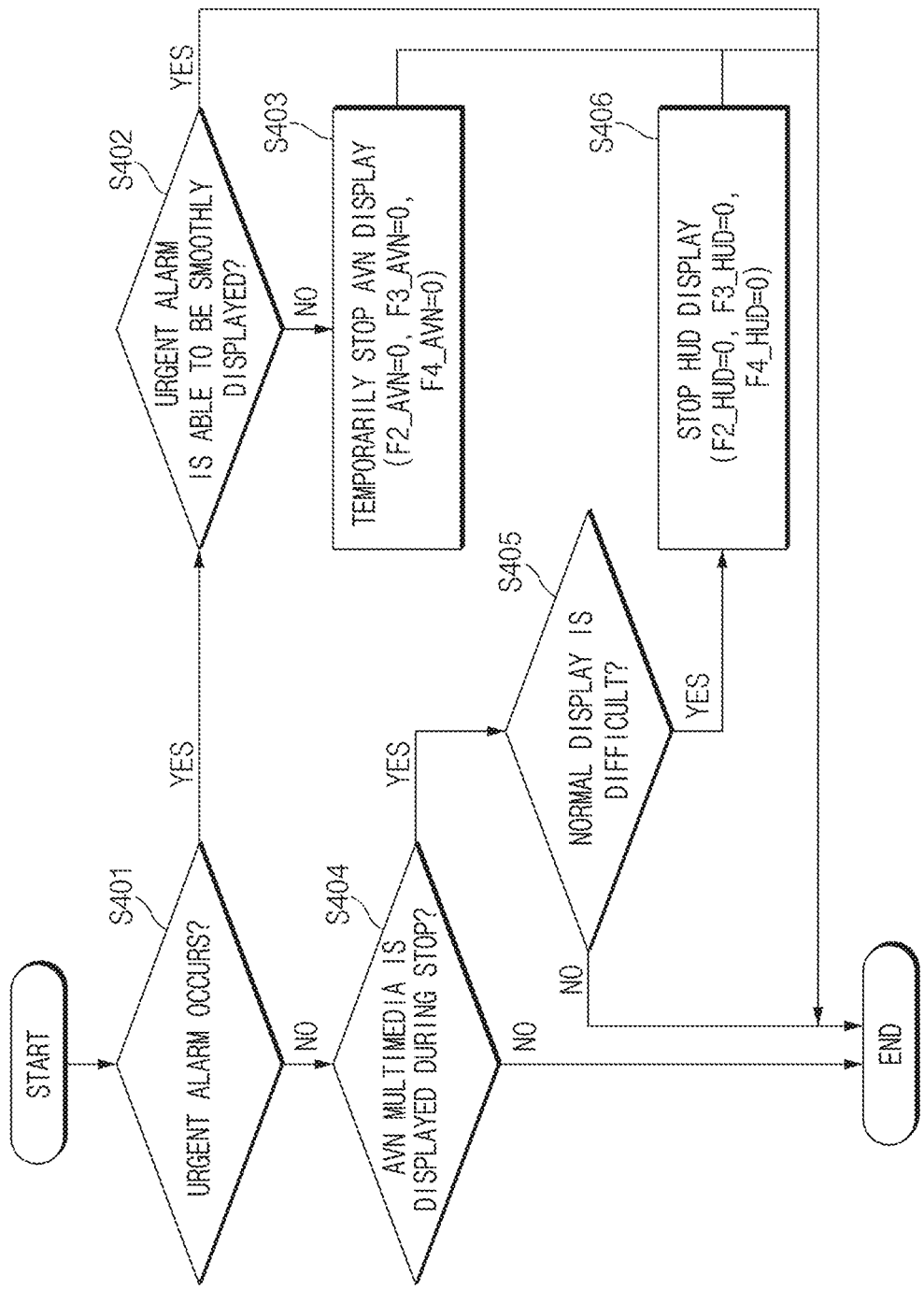
FIG. 6 is a flowchart illustrating a method of calculating a weight for distributing control resources when an urgent warning occurs by the apparatus for controlling the display for the vehicle, embodiments of the present disclosure.

Hereinafter, a method of calculating the display control resource distribution weight when the urgent alarm occurs by the vehicle display control apparatus will be described in detail with reference to FIG. 6. FIG. 6 is a flowchart illustrating the method of calculating the display control resource distribution weight when the urgent alarm occurs, by the vehicle display control apparatus, according to an embodiments of the present disclosure.

First, the vehicle display control apparatus 200 determines whether there occurs a situation that the urgent alarm is required due to the driving situation or the failure of the vehicle (S401).

When there occurs the situation that the urgent alarm is required, the vehicle display control apparatus 200 determines whether the urgent alarm is currently displayed on the first display 310, the second display 320, and the third display 330 (S402). In detail, the display of the urgent alarm may not be displayed depending on whether the display is current used.

Accordingly, when the display of the urgent ala it is difficult, the screen of the third display 330, which is being operated, is temporarily stopped, all display control resources are provided to one of the first display 310 or the second display 320 without distributing the display control resources, thereby maximizing the performance of the display for the urgent alarm (F2_AVN=0, F3_AVN=0, and F4_AVN=0)(S403).

Meanwhile, when it is not determined in operation S401 that there occurs situation that the urgent alarm is required, the vehicle display control apparatus 200 determines whether multimedia content is being displayed on the third display 330 while the vehicle is stopped (S404).

The vehicle display control apparatus 200 determines whether the displaying of the multimedia content is normally performed if it is determined that the multimedia content is being displayed on the third display 330 (S405). If it is determined that the normally displaying of the multimedia content is difficult, the vehicle display control apparatus 200 stops the operation of the first display 310 to increase the display control resource distribution weight of the third display 330 (S406). In particular, when the screen of the guide to the interconnection, which serves as multimedia content, is displayed on the third display 330, the vehicle display control apparatus 200 assists the vehicle to be smoothly driven by increasing the display control resource distribution weight to be applied to the third display 330.

As described above, according to the present invention, the display control resource distribution weights for display performance are differently provided based on the autonomous driving state, the gaze direction of the user, and the content characteristic, thereby smoothly controlling, with lower performance, a plurality of high-performance displays.

Figure 7:
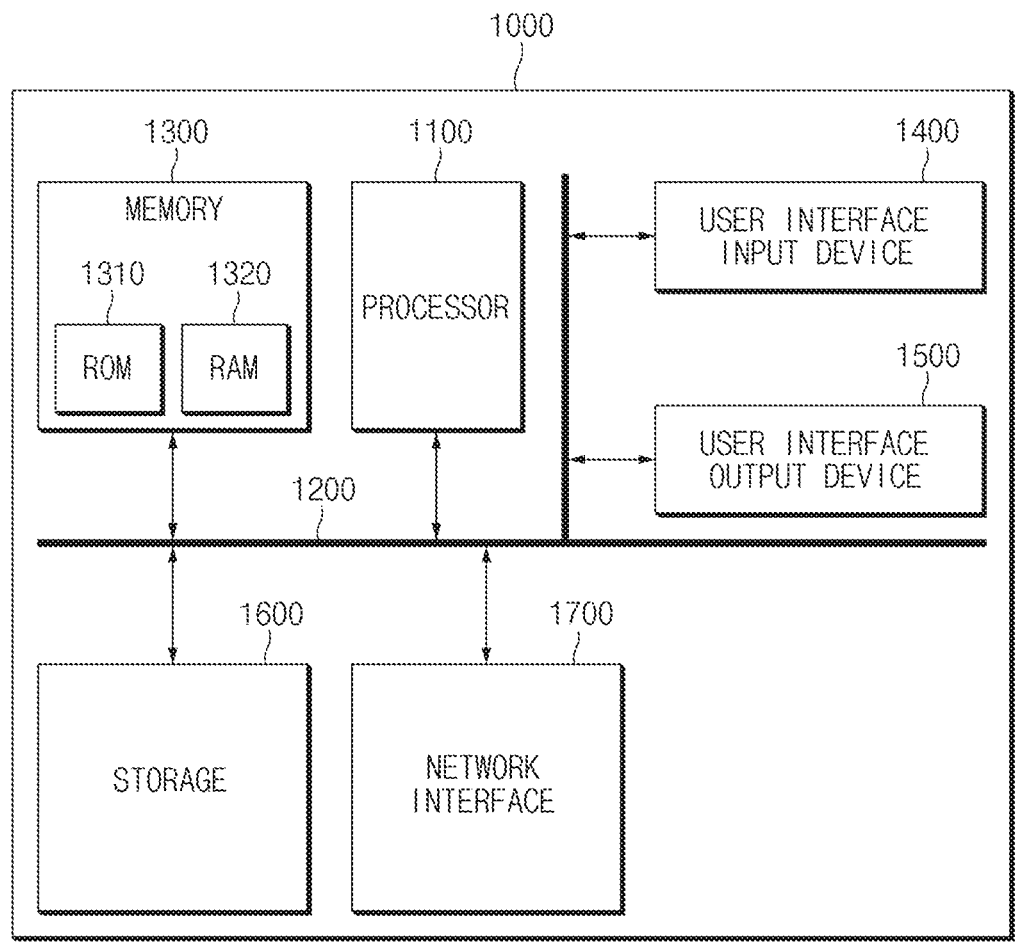
FIG. 7 is a computer system, according to embodiments of the present disclosure.

FIG. 7 is a computer system, according to embodiments of the present disclosure.

As shown in FIG. 7, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the embodiments disclosed in the specification may be directly implemented with a hardware module, a software module, or combinations thereof, executed by the processor 1100. The software module may reside on a storage medium (e.g., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM).

An exemplary storage medium may be coupled to the processor 1100. The processor 1100 may read out information from the storage medium and may write information in the storage medium. Alternatively, the storage medium may be integrated with the processor 1100. The integrated processor and storage medium may reside in an application specific integrated circuit (ASIC). The ASIC may reside in a user terminal. Alternatively, the integrated processor and storage medium may reside as a separate component of the user terminal.

As described above, the display control resource distribution ratio based on the at least one of an autonomous driving state, the gaze direction, and the content characteristic displayed on a display may be determined and the at least one display may be controlled based on the determined display control resource distribution ratio.

While the present disclosure has been described with reference to certain embodiments, it will be apparent to those skilled in the art that various changes and modifications may be made without departing from the spirit and scope of the present disclosure.

Therefore, embodiments of the present disclosure described herein are not limiting, but illustrative, and the spirit and scope of the present disclosure is not limited thereto. The spirit and scope and the present disclosure should be interpreted by the following claims, it should be interpreted that all technical ideas which are equivalent to the present disclosure are included in the spirit and scope of the present disclosure.

What is claimed is:

1. A vehicle display control apparatus for controlling a plurality of displays of a vehicle, the vehicle display control apparatus comprising:
 a processor configured to:
  calculate a display control resource distribution ratio of the plurality of displays based on at least one of: an autonomous driving state of the vehicle, a gaze direction of a user, and a characteristic of content displayed by each of the plurality of displays, and
  control operation of the plurality of displays by allocating a control resource to each of the plurality of displays based on the calculated display control resource distribution ratio; and
 a storage configured to store the calculated display control resource distribution ratio,
 wherein the display control resource distribution ratio of the processor is a ratio of resource of the processor allocated to each of the plurality of displays for controlling each of the plurality of displays.

2. The vehicle display control apparatus of claim 1, wherein the processor is further configured to:
 calculate a display control resource distribution weight of each of the plurality of displays based on at least one of: the autonomous driving state of the vehicle, the gaze direction of the user, and the characteristic of the content displayed by each of the plurality of displays.

3. The vehicle display control apparatus of claim 2, wherein the processor is further configured to:
 calculate the display control resource distribution ratio of each of the plurality of displays based further on the calculated display control resource distribution weight of each of the plurality of displays.

4. The vehicle display control apparatus of claim 3, wherein
 the processor is further configured to:
  divide a sum of each display control resource distribution weight of a first display among the plurality of displays by a sum of all display control resource distribution weights of the plurality of displays, wherein each display control resource distribution weight is calculated based on the autonomous driving state of the vehicle, the gaze direction of the user, and the characteristic of the content displayed by each of the plurality of displays;
  convert a result of the division to a percentage value;
  subtract a display control resource distribution ratio for a minimum screen display from the percentage value; and
  set a result of the subtraction as a display control resource distribution ratio of the first display.

5. The vehicle display control apparatus of claim 4, wherein the processor is further configured to:
 when the vehicle is in a semi-autonomous driving state, increase the display control resource distribution weight of the first display, which displays a driving state of the vehicle, or a display control resource distribution weight of a second display, which displays an alarm, among the plurality of displays;
 when the vehicle is in the autonomous driving state, increase a display control resource distribution weight of a third display, which displays multimedia content, among the plurality of displays; and
 when the vehicle is in a normal driving state, increase the display control resource distribution weight of the first display.

6. The vehicle display control apparatus of claim 4, wherein the processor is further configured to:
 increase a display control resource distribution weight of a display, which is positioned in the gaze direction of the user, among the plurality of displays based on the gaze direction of the user.

7. The vehicle display control apparatus of claim 6, wherein the processor is further configured to:

when the gaze direction of the user is a forward direction, increase a display control resource distribution weight of a head-up display among the plurality of displays;

when the gaze direction of the user is a downward direction, increase a display control resource distribution weight of a cluster display among the plurality of displays; and when the gaze direction of the user is a right direction, increase a display control resource distribution weight of an audio-video-navigation (AVN) display among the plurality of displays.

8. The vehicle display control apparatus of claim 4, wherein the processor is further configured to:

when an alarm is displayed by the first display in an emergency situation, increase the display control resource distribution weight of the first display or a display control resource distribution weight of a second display, which displays an alarm, among the plurality of displays; and when a guide to an intersection is displayed, increase a display control resource distribution weight of a third display, which displays multimedia content, among the plurality of displays until the vehicle passes the intersection.

9. The vehicle display control apparatus of claim 8, wherein the processor is further configured to:

when an urgent alarm is displayed due to failure of the vehicle while the third display is operating, control operation of the plurality of displays so as to use all resources for the first display or the second display after temporarily stopping operation of the third display.

10. A vehicle system comprising:

a plurality of displays, each display provided at different positions inside a vehicle; and a vehicle display control apparatus configured to:
calculate a display control resource distribution ratio of each of the plurality of displays based on at least one of: an autonomous driving state of the vehicle, a gaze direction of a user, and a characteristic of content displayed by each of the plurality of displays; and control operation of each of the plurality of displays by allocating a control resource to each of the plurality of displays based on the calculated display control resource distribution ratio, wherein the display control resource distribution ratio of the processor is a ratio of resource of the processor allocated to each display for controlling each display.

11. The vehicle system of claim 10, wherein the vehicle display control apparatus is further configured to calculate a display control resource distribution weight of each of the plurality of displays based on at least one of: the autonomous driving state of the vehicle, the gaze direction of the user, and the characteristic of the content displayed by each of the plurality of displays.

12. The vehicle system of claim 11, wherein the vehicle display control apparatus is further configured to calculate a display control resource distribution ratio of each of the plurality of displays based further on the calculated display control resource distribution weight of each of the plurality of displays.

13. A method of controlling a plurality of displays of a vehicle, the method comprising:

calculating, by a processor, a display control resource distribution ratio of each of the plurality of displays based on at least one of: an autonomous driving state of the vehicle, a gaze direction of a user, and a characteristic of content displayed by each of the plurality of displays; and controlling, by the processor, operation of each of the plurality of displays by allocating a control resource to each of the plurality of displays based on the calculated display control resource distribution ratio, wherein the display control resource distribution ratio of the processor is a ratio of resource of the processor allocated to each display for controlling each display.

14. The method of claim 13, wherein the calculating of the display control resource distribution ratio comprises:

calculating, by the processor, a display control resource distribution weight of each of the plurality of displays based on at least one of: the autonomous driving state of the vehicle, the gaze direction of the user, and the characteristic of the content displayed by each of the plurality of displays.

15. The method of claim 14, wherein the calculating of the display control resource distribution ratio further comprises:

calculating, by the processor, the display control resource distribution ratio of each of the plurality of displays based further on the calculated display control resource distribution weight of each of the plurality of displays.

16. The method of claim 15, wherein
the calculating of the display control resource distribution ratio further comprises:

dividing, by the processor, a sum of each display control resource distribution weight of a first display among the plurality of displays by a sum of all display control resource distribution weights of the plurality of displays, wherein each display control resource distribution weight is calculated based on the autonomous driving state of the vehicle, the gaze direction of the user, and the characteristic of the content displayed by each of the plurality of displays;

converting, by the processor, a result of the division to a percentage value;

subtracting, by the processor, a resource distribution ratio for a minimum screen display from the percentage value; and setting, by the processor, a result of the subtraction as a display control resource distribution ratio of the first display.

17. The method of claim 6, wherein the calculating of the display control resource distribution weight comprises:

when the vehicle is in a semi-autonomous driving state, increasing, by the processor, a display control resource distribution weight of the first display, which displays a driving state of the vehicle, or a display control resource distribution weight of a second display, which displays an alarm, among the plurality of displays;

when the vehicle is in the autonomous driving state, increasing, by the processor, a display control resource distribution weight of a third display, which displays multimedia content, among the plurality of displays; and when the vehicle is in a normal driving state, increasing, by the processor, a display control resource distribution weight of the first display.

18. The method of claim 6, wherein the calculating of the display control resource distribution weight comprises:

increasing, by the processor, a display control resource distribution weight of a display, which is positioned in the gaze direction of the user, among the plurality of displays based on the gaze direction of the user.

19. The method of claim 18, wherein the calculating of the display control resource distribution weight further comprises:
- when the gaze direction of the user is a forward direction, increasing, by the processor, a display control resource distribution weight of a head-up display among the plurality of displays;
- when the gaze direction of the user is a downward direction, increasing, by the processor, a display control resource distribution weight of a cluster display among the plurality of displays; and
- when the gaze direction of the user is a right direction, increasing, by the processor, a display control resource distribution weight of an audio-video-navigation (AVN) display among the plurality of displays.

20. The method of claim 6, wherein the calculating of the display control resource distribution weight comprises:
- when an alarm is displayed by the first display in an emergency situation, increasing, by the processor, the display control resource distribution weight of the first display or a display control resource distribution weight of a second display, which displays an alarm, among the plurality of displays; and when a guide to an intersection is displayed, increasing, by the processor, a display control resource distribution weight of a third display, which displays multimedia content, among the plurality of displays until the vehicle passes the intersection.

* * * * *